(12) United States Patent
Beier et al.

(10) Patent No.: US 7,293,313 B2
(45) Date of Patent: Nov. 13, 2007

(54) METHOD OF DETERMINING THE WEIGHT OF LAUNDRY IN A WASHING MACHINE DRUM

(75) Inventors: Dominik Beier, Guetersloh (DE); Juergen Koschnicke, Guetersloh (DE); Diethard Krause, Guetersloh (DE)

(73) Assignee: Miele & Cie. KG, Guetersloh (DE)

( * ) Notice: Subject to any disclaimer, the term of this patent is extended or adjusted under 35 U.S.C. 154(b) by 471 days.

(21) Appl. No.: 10/900,783

(22) Filed: Jul. 28, 2004

(65) Prior Publication Data

US 2005/0022315 A1    Feb. 3, 2005

(30) Foreign Application Priority Data

Jul. 28, 2003   (DE)   ................. 103 34 572

(51) Int. Cl.
    *D06F 33/02*   (2006.01)
(52) U.S. Cl. .................. 8/159; 68/12.06; 68/12.04
(58) Field of Classification Search ............. 68/12.06, 68/12.04, 24; 8/158, 159
    See application file for complete search history.

(56) References Cited

U.S. PATENT DOCUMENTS 3,763,670 A * 10/1973 Harrold ................ 68/12.06
5,165,260 A * 11/1992 Geiger ................. 68/12.04
5,301,522 A *  4/1994 Ikemizu et al. ......... 68/12.06
5,907,880 A *  6/1999 Durazzani et al. .......... 8/159
6,974,000 B2 * 12/2005 Carlson et al. ......... 188/267.2

FOREIGN PATENT DOCUMENTS

| DE | 40 18 599   | 1/1991  |
| DE | 4018599     | 1/1991  |
| DE | 199 46 245  | 4/2000  |
| DE | 19946245    | 4/2000  |
| DE | 100 46 712  | 4/2001  |
| DE | 10046712    | 4/2001  |
| DE | 101 22 749  | 12/2002 |
| DE | 10122749    | 12/2002 |
| DE | 102 25 335  | 12/2003 |
| DE | 10225335    | 12/2003 |
| JP | 6-282       | * 1/1994 |

* cited by examiner

*Primary Examiner*—Frankie L. Stinson
(74) *Attorney, Agent, or Firm*—Darby & Darby PC

(57) ABSTRACT

A method of determining the weight of laundry placed in the drum rotatably mounted in a vertically moveable sudsing container of a washing machine, in which a value representative of the highest position attained by the sudsing container in a previous washing cycle or after connecting the washing machine to network current is compared against the position attained by the sudsing container after laundry has been placed in the drum to derive from the difference a value representative of the weight of the laundry.

4 Claims, 2 Drawing Sheets

METHOD OF DETERMINING THE WEIGHT OF LAUNDRY IN A WASHING MACHINE DRUM

BACKGROUND OF THE INVENTION

1. Field of the Invention

The invention, in general, relates to a method of determining the weight of laundry in the drum of a washing machine and, more particularly, to a method of determining the weight of laundry in a washing drum rotatably mounted within a sudsing container suspended in the housing of a washing machine by springs in its upper region and in its lower region by at least one shock absorber consisting of a cylindrical housing and a frictionally coated piston rod reciprocally movable therein between two abutments with associated spring elements, the drum cooperating with a system for defining the weight of the laundry in the drum with a measuring circuit for determining the lowering of the sudsing container as a function of the weight.

2. The Prior Art

A washing machine including a system for determining the weight of laundry contained in the drum is manufactured and sold under the designation W 377 WPS by the assignee of the instant application. It is also known from German patent specification DE 199 46 245 A1. Washing machines of this type are provided with a displacement sensor arranged parallel to the shock absorber. The sudsing container with the washing drum rotatably mounted therein is connected to the housing by springs. As soon as laundry is placed in the drum the total mass of the sudsing container changes. As a result of the increasing mass the springs are extended or displaced further so that as the amount of the laundry placed into the drum is increased the downward movement of the sudsing container increases as well. The resulting level of the sudsing container is determined by means of the displacement sensor. Accordingly, the displacement sensor releases a signal the difference of which relative to a zero position, i.e. the empty drum, is proportional to the weight of the deposited laundry.

For a spinning operation it is necessary to attenuate or dampen the oscillating amplitude at least during transition through the critical number of rotations (resonance of the spring-mass-system consisting of the springs and the mass of the filled sudsing container). This is accomplished by at least one shock absorber positioned between the sudsing container and the bottom of the housing. Weighing of the laundry takes place while the sudsing container is at rest. At this point in time, the shock absorbers must not generate any forces, as they would have to be overcome by the force of the weight of the laundry before the sudsing container could move downwardly and thereby generate a displacement signal measurable by the displacement sensor. Therefore, the W 377 WPS washing machine uses oil-hydraulic shock absorbers of velocity proportional damping power the damping power of which is very low when they are not moved. Ideally, there would be no attenuation at all. Only when the sudsing container is lowered, velocities arise which generate of counter forces which limit the oscillating amplitude. The disadvantages of the oil-hydraulic shock absorbers reside in their high price, low damping action, acoustic problems and low environmental compatibility because of special requirements relating to the disposal of the oil.

German patent specification DE 49 18 599 A1 discloses a so-called dash-pot damper. It is, in fact, a frictional damper in which the frictional coating is movably mounted on a piston rod between two spring elements, each spring element being supported by an abutment connected to the piston rod. Such an arrangement results in a damping action which is dependent upon amplitude.

From German patent specification DE 100 46 712 A1 it is known to use a dash-pot damper in combination with a displacement sensor. The disadvantage of this measuring system of a dash-pot damper with but one displacement sensor is its undefined initial state. If the drum is empty, it is possible that the frictional coatings are in a position which does not correspond to the zero position of the sudsing container. The suspension springs then exert a force upon the sudsing container which is less than the frictional force of the friction coating. Thus, there is an undefined force which act against the system and which leads to an additional extension of the springs on which the assembly is suspended. The extension of the springs, in turn, is added to the displacement measured by the displacement sensor. Unlike arrangements utilizing a velocity proportional damper (e.g. an oil-hydraulic damper) it is thus not possible to define the weight of the deposited laundry. Hence, the weight of the laundry can only be determined with an initially empty drum which is filled afterwards. However, if the washing machine in its idle state is used as a laundry collector or hamper, it will not be possible subsequently to switch on the washing machine and to obtain a correct reading of the weight of the laundry. Hence, such a machine is of limited utility.

German patent specification DE 101 22 749 A1 discloses a washing machine and, in connection therewith, a method of determining the weight of laundry in which a dash-pot damper is used which is provided with two displacement sensors. Displacement sensors are relatively expensive components, and their added costs take away any economic advantage otherwise to be derived from cost-efficient shock absorbers.

OBJECTS OF THE INVENTION

It is thus an object of the invention to provide for a method of the kind referred to supra which, the use of a dash-pot damper with but one way sensor notwithstanding, makes possible a precise determination of the weight of laundry in a washing machine.

BRIEF SUMMARY OF THE INVENTION

In accordance with the invention, the object is accomplished by a system which determines a positional value corresponding to the highest position of the sudsing container during a given section of a washing program and which feeds this value to a non-volatile storage or memory in the system, and by this positional value being used in a subsequent washing cycle as the value corresponding to a zero value.

Additional advantageous embodiments and improvements may be gathered from the subsequent sub-claims.

Other advantages will, in part be obvious and will in part appear hereinafter.

BRIEF SUMMARY OF THE INVENTION

The advantages to be derived from practicing the invention are the result of precise measurements obtained by simple means and using only one displacement sensor.

In an advantageous embodiment of the method in accordance with the invention the comparison means determines the positional value corresponding to the highest position of the sudsing container at the end of a washing program.

In a further advantageous embodiment of the method in accordance with the invention the comparison means recognizes rising of the position of the sudsing container after connection of the washing machine to network current at the beginning of a subsequent washing cycle and feeds the value corresponding to the highest position of the sudsing container to an evaluation circuit which writes the newly determined value over the zero position value determined during the previous washing program. In this manner it is possible to sense the actual zero position even if the user removes the laundry from the drum prior to executing a washing cycle and after having connected the washing machine to power. This could be the case, for instance, if following a preceding washing cycle, laundry has remained in the drum or if the drum has been used as laundry storage.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DETAILED DESCRIPTION OF THE PREFERRED EMBODIMENT

Figure 1:
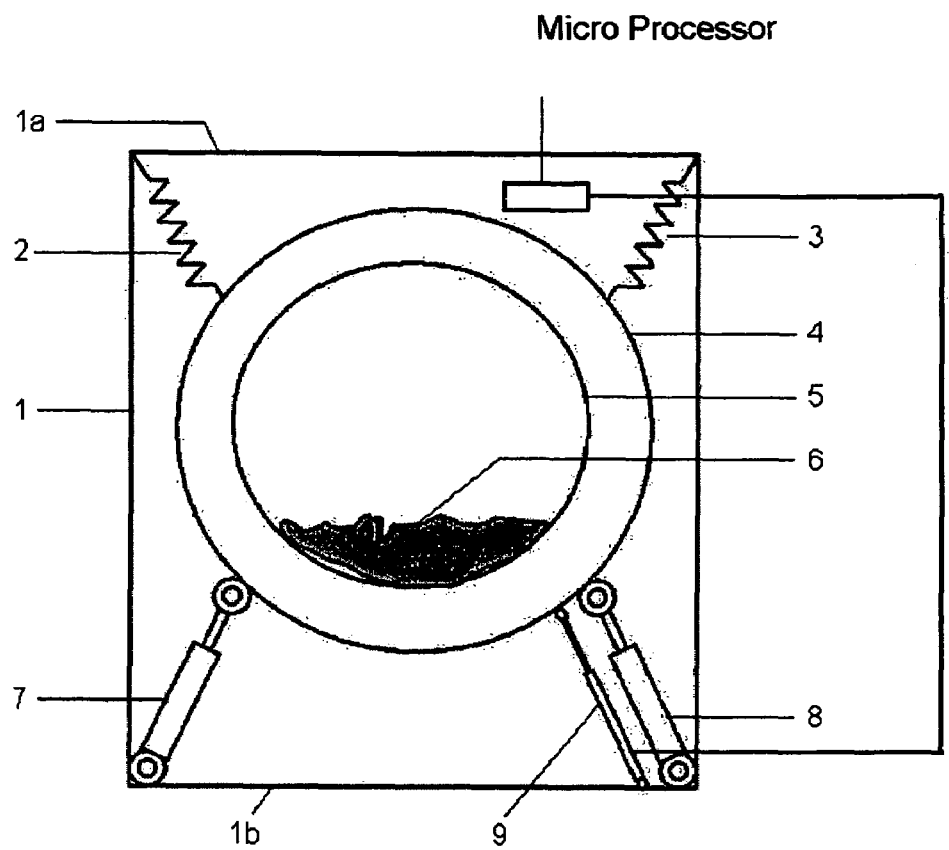
FIG. 1 is a schematic representation of a washing machine for carrying out the method in accordance with the invention.

FIG. 1 depicts a washing machine provided with a sudsing container 4 with a washing drum 5 rotatably mounted therein. The sudsing container 4 is suspended at its upper section from the housing 1 of the washing machine by springs 2, 3. As laundry 6 is deposited into the drum 5, the total mass of the sudsing container 4 consisting of the mass $m_{LB}$ of the empty sudsing container 4 and the mass $m_w$ of the laundry 6 changes. The increase in mass leads to a further extension of the springs 2,3 so that the sudsing container 4 will hang the lower the greater is the mass of the deposited laundry 6. The downward movement $\Delta s$ of the sudsing container 4 in response to the force of the weight of the laundry is detected by a displacement sensor 9. The displacement sensor 9 thus releases a signal proportional to the weight $m_w$ of the deposited laundry to a measuring circuit M. The measuring circuit M is integrated in the micro processor control MC of the washing machine and it determined a value representative of the weight on the basis of the downward movement $\Delta s$ and the spring constant or constants. The weight value is either used in a display (not shown) as user information or by the micro processor control MC directly for controlling the washing program.

For the spinning operation the oscillating amplitude must be limited at least during the transition through the critical range of the number of rotations (resonance of the spring mass system consisting of the springs 2,3 and the mass of the filled sudsing container 4). This limitation is provided by two shock absorbers 7, 8 structured as dash-pot shock absorbers and arranged between the sudsing container 4 and the bottom of the housing 1b.

Figure 2:
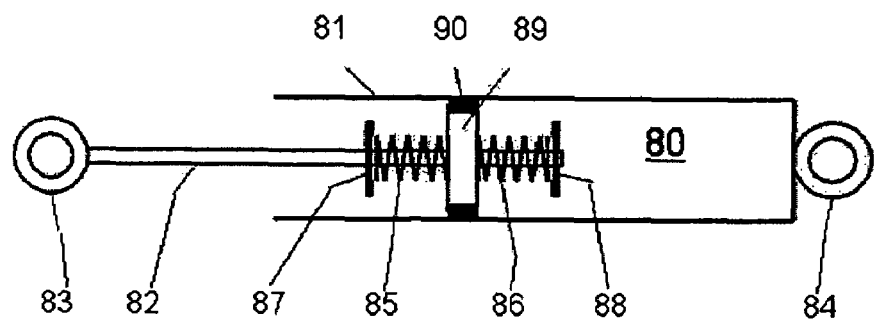
FIG. 2 is a schematic representation of a dash-pot damper in longitudinal section.

FIG. 2 depicts a spring loaded dash-pot damper or shock absorber 80 of the kind known from German patent specification No.: DE 40 18 599 A1, but which, in an improved structure, is part of the assignee's patent portfolio (see the older post-published application DE 102 25 335 A1). It consists of a cylindrical damper housing 81 and a piston rod 82 axially movable in the housing 81. The piston rod 82 is mounted on the sudsing container 4 by a knuckle 82, and by a knuckle 84 the damper housing 81 is mounted on the bottom 1b of the housing. The piston rod 82 is provided with two rigidly mounted spring plates 87, 88. Between them, two spring elements 85, 86 are seated on the piston rod 82 which between them retain a coated block 89. The coated block 89 supports frictional coatings 90 which engage the interior wall of the housing 81 of the damper. Any movement of the sudsing container 4 is transmitted by the piston rod 82 to the two spring elements 85, 86 which, in turn, transmit the force onto the moveably mounted coated block 89. Movement of the piston rod 82 in a given direction initially causes the spring elements to be respectively extended and compressed in the same direction. Once the built-up force has reached a level which exceeds the frictional force between the coated block 89 and the interior wall of the cylinder 81, the coated block 89 and its frictional coating 90 will move as well.

Figure 3:
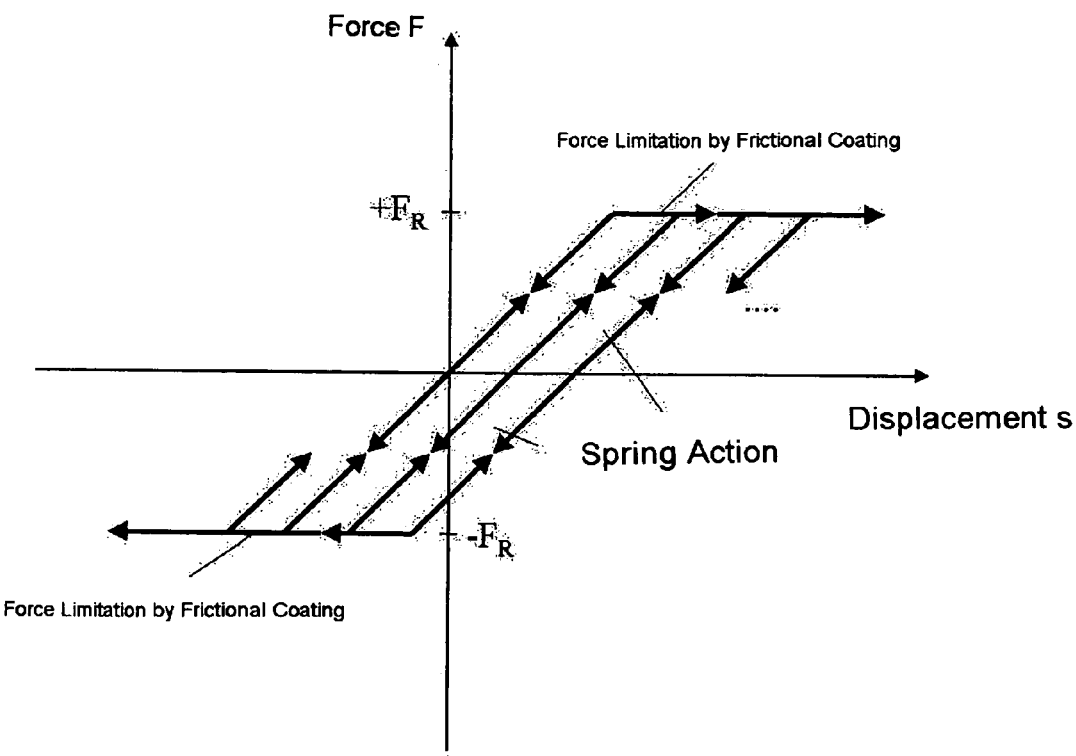
FIG. 3 is a force-displacement diagram of a dash-pot damper.

FIG. 3 shows an idealized force-displacement diagram of the dash-pot damper 80. The difference relative to a simple frictional damper is that a displacement s occurs at the initial stage of small forces F between $F_R$ and $-F_R$ is traveled. The spring elements 85, 86 provide for a transitional range in which the damper 80 operates linearly. Hence, utilization of dash-pot dampers 80 in a washing machine of the kind shown in FIG. 1, causes the sudsing container 4 to move downwardly while laundry 6 is being deposited into it. This can be measured as a change in displacement, so that, taking into account the spring constant, the weight of the load in the drum can be calculated. The displacement sensor 9 may, as shown in FIG. 1, either be positioned substantially parallel to one of the shock absorbers, or it may be integrated into it in two different ways (not shown): One way is an arrangement between the piston rod 82 and the housing 81 of the damper; another way is an arrangement between the piston rod 82 and one of the frictional coatings 90. Regardless of where the sensor is mounted, the following disadvantages will result:

If the force of the dash-pot damper 80 at the beginning of loading is close to the frictional force, the force exerted by a small additional weight of deposited laundry 6 will suffice to cause the frictional coating 90 to slide and movement out of the linear range.

The initial state is not defined. If the drum (5) is empty, a force between $-F_R$ and $+F_R$ will arise in the dash-pot damper 80. Hence, there is an undefined force in the range between $-F_R$ to $+F_R$ which acts in an offsetting way on the system and which is thus incorporated in the displacement of the springs 2,3 by which the sudsing container 4 is suspended. In order to define the weight of the laundry, the extension of the tension springs 2, 3 when the drum is empty or, alternatively, the force of the weight transmitted by the sudsing container 4 to the housing (either will hereafter be referred to as "zero position") must be known in order determine the weight of the laundry on the basis of the measured downward movement $\Delta s$ (alternatively the force of the weight) and the previously determined zero position.

The extension of the springs is incorporated in the displacement measured by the displacement sensor. Unlike with velocity-proportional dampers (e.g. an oil-hydraulic damper), an absolute determination of the mass of the deposited laundry is thus not possible. In other words, it is possible to determine the weight of laundry if the drum is initially empty and filled subsequently. However, if the drum in its idle state is used as a laundry collector or hamper, it is not possible to switch on the washing machine and to obtain a correct reading of the weight of the laundry. Such a system is, therefore, of limited usefulness.

Figure 4:
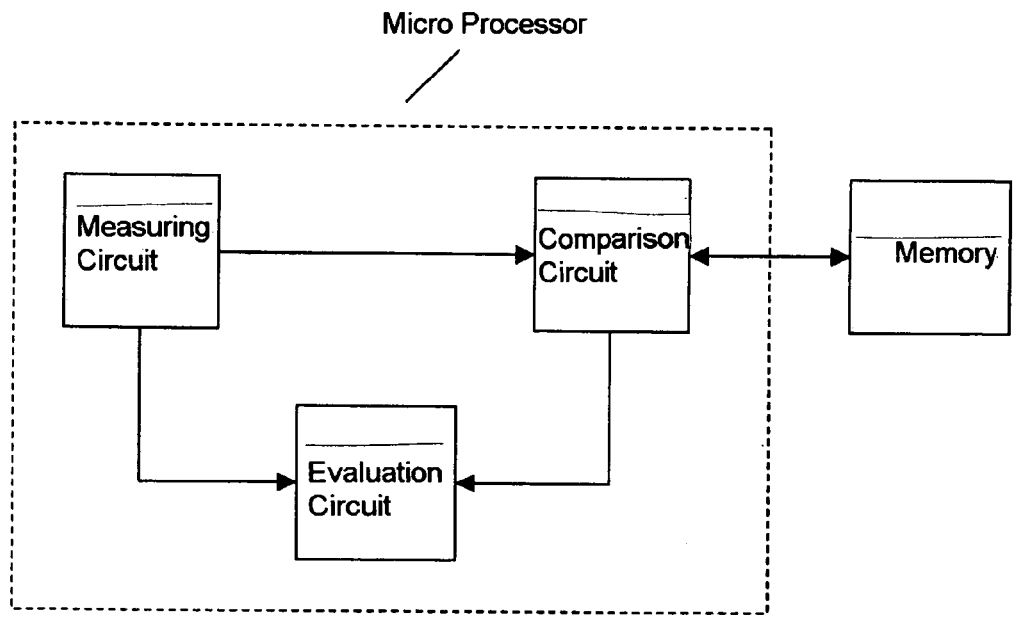
FIG. 4 Is a block diagram of a washing machine control circuit.

This is the basis of the present invention which eliminates these disadvantages. For purposes of carrying out the method, a comparison circuit V is integrated in the washing machine controls MC (see FIG. 4) aside from the measuring circuit M for determining the weight of the laundry. The comparison circuit V, in turn, is connected to a non-volatile storage or memory SP. In addition, the measuring circuit M and the comparison circuit V are connected to an evaluation circuit A.

When the drum is unloaded at a predetermined point in time prior to termination of a washing program, for instance after a final spin cycle, the contents of the non-volatile memory SP are erased first. Thereafter, the displacement sensor 9 measures the downward movement Δs of the sudsing container at 1 second intervals and feeds its measured values to the measuring circuit M which, on the basis of these values, determines the weight. The comparison circuit V now either compares the weight or the downward movement Δs as a positional value with the value of the non-volatile memory SP. Whenever the actual positional value corresponds to a higher sudsing container position and, therefore, to a lower weight of the laundry than the value present in the memory SP, the comparison circuit overwrites the value in the memory SP with the actual value. Following termination of a current program, a positional value is stored in the memory SP which corresponds to the highest position of the sudsing container in the last section of the washing program. In an ideal case, i.e. at a completely emptied drum, it corresponds to a zero weight of the laundry. At the start of the following program this value will be used by the measuring circuit as the value corresponding to the zero position.

For safety reasons the comparison circuit V is also activated at the start of a program, i.e. after connecting the washing machine to network current. Initially the contents of the non-volatile memory SP is not erased and the positional value determined in the previous washing program is initially retained. The comparison circuit V is designed to recognize upward movement in the position of the sudsing container so that the positional value corresponding to the highest position of the sudsing container is fed to the evaluation circuit A which then overwrites the zero position value stored during the previous washing program with the newly determined value.

What is claimed is:

1. A method of determining the weight of laundry in a washing machine of the type comprising a vertically movable sudsing container having a drum rotatably mounted therein and suspended by at least one spring and supported by at least one frictional shock absorber comprising a cylindrical housing and a piston rod provided with a member frictionally engaging the cylindrical housing and movable along the piston rod between first and second abutments against the bias of at least one spring, comprising the steps of:
   measuring the highest position of the sudsing container during a first washing operation and storing a first value representative thereof in a memory;
   measuring the downward movement of the sudsing container in response to laundry placed therein in a second washing operation and deriving a second value representative thereof; and
   comparing the first and second values to derive a third value representative of the weight of the laundry placed in the drum.

2. The method of claim 1, wherein the first value is measured during an end of the first washing program.

3. The method of claim 1, further comprising the steps of:
   measuring any upward movement of the sudsing container after connecting the washing machine to network current to derive a fourth value representative of the highest position attained by the upward movement; and
   replacing the first value stored in memory by the fourth value.

4. A method of determining the weight of laundry in a washing machine of the type comprising a vertically movable sudsing container having a drum rotatably mounted therein and suspended by at least one spring and supported by at least one frictional shock absorber comprising a cylindrical housing and a piston rod provided with a member frictionally engaging the cylindrical housing and movable along the piston rod between first and second abutments against the bias of at least one spring, comprising the steps of:
   measuring the highest position of the sudsing container during a washing operation and storing a first value representative thereof in a memory;
   measuring the downward movement of the sudsing container in response to laundry placed therein and deriving a second value representative thereof;
   comparing the first and second values to derive a third value representative of the weight of the laundry placed in the drum;
   measuring any upward movement of the sudsing container after connecting the washing machine to network current to derive a fourth value representative of the highest position attained by the upward movement; and
   replacing the first value stored in memory by the fourth value.

* * * * *

UNITED STATES PATENT AND TRADEMARK OFFICE
CERTIFICATE OF CORRECTION

PATENT NO.       : 7,293,313 B2  
APPLICATION NO.  : 10/900783  
DATED            : November 13, 2007  
INVENTOR(S)      : Dominic Beier et al.

Page 1 of 1

It is certified that error appears in the above-identified patent and that said Letters Patent is hereby corrected as shown below:

Cover Page item [75] inventor:

Delete "Dominik" and insert --Dominic--.

Signed and Sealed this

First Day of April, 2008

JON W. DUDAS  
*Director of the United States Patent and Trademark Office*